(12) United States Patent
Himayat et al.

(10) Patent No.: US 9,699,800 B2
(45) Date of Patent: Jul. 4, 2017

(54) SYSTEMS, METHODS, AND APPARTATUSES FOR BEARER SPLITTING IN MULTI-RADIO HETNET

(71) Applicant: Intel IP Corporation, Santa Clara, CA (US)

(72) Inventors: Nageen Himayat, Fremont, CA (US); Jing Zhu, Portland, OR (US); Penny Efraim-Sagi, Kfar Sava (IL); Jerome Parron, Fuerth (DE); Shu-Ping Yeh, New Taipei (TW); Martin Kolde, Neubiberg (DE); Alexander Sirotkin, Petach Tikva (IL); Mo-Han Fong, Sunnyvale, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 31 days.

(21) Appl. No.: 14/705,669

(22) Filed: May 6, 2015

(65) Prior Publication Data

US 2016/0119939 A1    Apr. 28, 2016

Related U.S. Application Data

(60) Provisional application No. 62/067,636, filed on Oct. 23, 2014.

(51) Int. Cl.
*H04W 36/22* (2009.01)
*H04W 72/12* (2009.01)
(Continued)

(52) U.S. Cl.
CPC ....... *H04W 72/12* (2013.01); *H04W 28/0278* (2013.01); *H04W 28/08* (2013.01);
(Continued)

(58) Field of Classification Search
CPC ..... H04W 88/06; H04W 28/08; H04W 28/02; H04W 28/0231; H04W 28/0289;
(Continued)

(56) References Cited

U.S. PATENT DOCUMENTS 6,112,088 A * 8/2000 Haartsen ........... H04W 36/0066
370/331
8,094,614 B2 * 1/2012 McNew ............. H04L 12/5693
370/329
(Continued)

FOREIGN PATENT DOCUMENTS

EP    2704481 A1    3/2014
WO   2014113072 A1  7/2014

OTHER PUBLICATIONS

Intel Corporation, "Discussions on Carrier Aggregation across LTE and WIFI", RP-111094, 3GPP TSG-RAN meeting #53, Fukuoka, Japan, Agenda Item 13.2.1, Sep. 13-16, 2011, 4 pages.
(Continued)

Primary Examiner — Mohamed Kamara
(74) Attorney, Agent, or Firm — Stoel Rives LLP

(57) ABSTRACT

Systems and methods for bearer splitting among multiple radio links are disclosed herein. User equipment (UE) may be communicatively coupled to an Evolved Universal Terrestrial Radio Access Network (E-UTRAN) Node B (eNB) by multiple radio links (e.g., an LTE link and a WLAN link). A transmitter may dynamically determine a splitting policy for how to split traffic among each link (e.g., what proportion to send over each link). In some embodiments, the transmitter may determine the splitting policy explicitly based on lower layer metrics. Alternatively, or in addition, each radio access interface may request data when a transmission opportunity becomes available, and the splitting policy may be determined implicitly from the data requests. For a UE, the splitting policy may be determined with network assis-
(Continued)

tance, which may include a resource allocation for an LTE link, a probability of successful transmission over a WLAN link, and/or the like.

25 Claims, 11 Drawing Sheets

(51) Int. Cl.
*H04W 28/08* (2009.01)
*H04W 28/02* (2009.01)
*H04W 72/04* (2009.01)
*H04W 76/02* (2009.01)
*H04W 84/12* (2009.01)
*H04W 88/08* (2009.01)

(52) U.S. Cl.
CPC ... *H04W 72/0446* (2013.01); *H04W 72/1215* (2013.01); *H04W 76/021* (2013.01); *H04W 72/1252* (2013.01); *H04W 84/12* (2013.01); *H04W 88/08* (2013.01)

(58) Field of Classification Search
CPC . H04W 16/14; H04W 28/22; H04W 36/0083; H04W 36/14; H04W 36/22; H04W 36/30; H04W 36/0082; H04W 16/10; H04W 72/04; H04L 47/14; H04B 7/15592
See application file for complete search history.

(56) References Cited

U.S. PATENT DOCUMENTS

| 2012/0188949 | A1* | 7/2012 | Salkintzis | H04L 45/308 370/329 |
| 2013/0088996 | A1* | 4/2013 | Hara | H04W 88/06 370/252 |
| 2013/0242897 | A1* | 9/2013 | Meylan | H04W 28/16 370/329 |
| 2014/0071925 | A1* | 3/2014 | Liu | H04W 28/08 370/329 |
| 2014/0092890 | A1* | 4/2014 | Lee | H04W 48/08 370/338 |
| 2014/0273884 | A1* | 9/2014 | Mantravadi | H04B 1/38 455/73 |
| 2014/0293970 | A1 | 10/2014 | Damnjanovic et al. | |
| 2015/0003435 | A1* | 1/2015 | Horn | H04L 5/0058 370/338 |
| 2015/0085800 | A1* | 3/2015 | Sivanesan | H04W 24/04 370/329 |

OTHER PUBLICATIONS

PCT/US2015/051045, International Search Report and Written Opinion, Dec. 23, 2015, 14 pages.

* cited by examiner

SYSTEMS, METHODS, AND APPARATUSES FOR BEARER SPLITTING IN MULTI-RADIO HETNET

RELATED APPLICATIONS

This application claims priority to and the benefit of U.S. Provisional Patent Application No. 62/067,636, filed Oct. 23, 2014, which is hereby incorporated by reference herein in its entirety.

TECHNICAL FIELD

The present disclosure relates to systems, methods, and apparatuses for splitting bearers over multiple radio links.

DETAILED DESCRIPTION OF PREFERRED EMBODIMENTS

Figure 1:
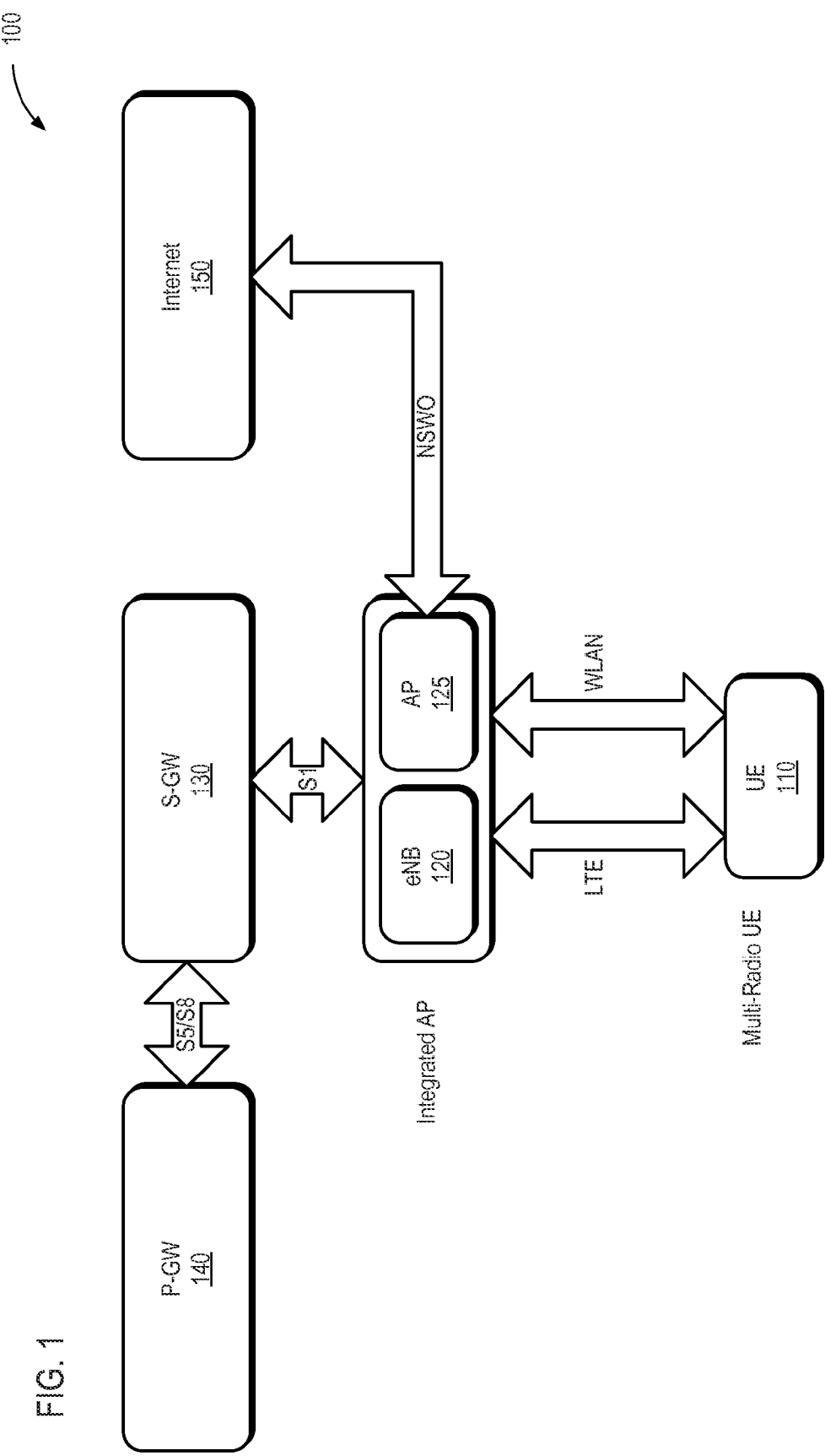
FIG. 1 is a schematic diagram of a system for communicating with a UE over multiple radio links.

Wireless mobile communication technology uses various standards and protocols to transmit data between a base station and a wireless communication device. Wireless communication system standards and protocols can include, for example, the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wireless Local Area Network (WLAN) or Wi-Fi.

In 3GPP radio access networks (RANs) in LTE systems, a base station may include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE). In LTE networks, an E-UTRAN may include a plurality of eNodeBs and may communicate with a plurality of UEs. An evolved packet core (EPC) may communicatively couple the E-UTRAN to an external network, such as the Internet. LTE networks include radio access technologies (RATs) and core radio network architecture that can provide high data rate, low latency, packet optimization, and improved system capacity and coverage.

An eNB may be able to send data over multiple radio links using different RATs. For example, the radio links may include a WLAN link, an LTE link, a millimeter wave link, and/or the like. The E-UTRAN may be used as a control and mobility anchor for the WLAN link, which may serve as an additional "carrier" within the LTE network for data offloading. Bearer traffic received by the E-UTRAN may be tunneled over the WLAN via a point-to-point (p2p) link between the eNB and the UE. The p2p link may be routed through the WLAN and may be setup with the help of a proprietary or standardized interface between the eNB and WLAN access point (AP). The bearer may be split over both the WLAN and LTE links, or in some embodiments, the entire bearer may be offloaded to the WLAN.

The bearer may be split and/or aggregated at any of various different layers of the protocol stack. For example, a data radio bearer may be split over the WLAN and LTE links above a packet data convergence protocol (PDCP) layer, inside the PDCP layer, below the PDCP layer, or the like. A WLAN adaptation transmit/receive (TX/RX) layer may handle all additional protocols required for the protocol data units (PDUs) delivered over the WLAN link. The additional protocols may include encryption, header compression, encapsulation, tunneling, etc. For example, a link aggregation transmit layer may be above a sequence numbering layer, above a header compression layer, above an integrity protection layer and/or a ciphering layer, above a layer for adding a PDCP header, below the layer for adding the PDCP header, etc. Similarly, a link aggregation receive layer may be below a layer for removing the PDCP header, above the layer for removing the PDCP header, above an integrity verification layer and/or a deciphering layer, above a header decompression layer, above a layer for ensuring in order delivery and for detecting duplicates, and/or the like.

For splitting at any layer, a proportion of traffic to be sent on each link may need to be determined (e.g., bearer split control); a granularity and/or frequency of bearer data transfer to each link may be determined (e.g., data transfer/flow control); rules and timing for retransmitting failed transmissions on another link may optionally be determined (e.g., cross RAT retransmission and/or automatic repeat request (ARQ) control). The bearer split control, data transfer/flow control, and/or cross RAT retransmission and/or ARQ control may be determined dynamically and /or statically. For example, dynamic bearer split decisions based on real-time measurements may maximize utilization of each link. The bearer split decisions may account for link quality and traffic quality of service (QoS) requirements across users.

Various embodiments may perform real-time decision making and traffic routing/splitting. In some embodiments, a transmitter may make dynamic bearer splitting decisions with limited coordination with a receiver, which may reduce signaling overhead. The transmitter may perform splitting at any protocol layer, may be an uplink or a downlink transmitter, and may include collocated radio interfaces for each link or non-collocated radio interfaces. The UE and eNB may be responsible for managing cross-RAT transmission policies of the uplink and downlink bearers respectively. However, in some embodiments, the UE bearer splitting decisions may include network assistance to the UE to preclude greedy decisions by individual UEs.

A link aggregation transmitter (LAT) may work with a link aggregation scheduler (LAS) to determine how bearer traffic will be assigned dynamically across each link. The LAT and LAS may be configured to operate under a push architecture, a pull architecture, a hybrid push/pull architecture, and/or the like. In the push architecture, the LAS may explicitly determine and control how traffic is split across multiple links and/or across multiple users. In the pull architecture, the LAS may implicitly determine splitting by relying on lower layer link schedulers to drive the splitting operation.

In the push architecture, the LAS may receive link and/or interface statistics, which may be reported by lower layer modules. The LAS may explicitly and dynamically compute a splitting policy between the links based on the link/interface statistics and/or may make assignments according to policies specified by a radio resource control (RRC) layer. In some embodiments, the LAS may account for statistics across all users before making decisions for each user and/or each bearer. Various optimization criteria may be used to make the decision. In other embodiments, simple decisions may be made based on statistics for individual bearers.

Once the LAS has determined the splitting policy, the LAT may divide received traffic based on the splitting policy. After division, the LAT may send the traffic to local buffers within the lower layers of the stack for each radio interface. Each radio interface may perform independent processing and scheduling across each link. In some embodiments, lower layer schedulers may exchange additional information to facilitate loosely coordinated assignments of radio resources according to system optimization metrics (e.g., proportional fair metric, delay sensitive metrics, queue length, etc.). In some embodiments, once the traffic is split, the transmission and scheduling policies of individual RATs may be used to send data through the protocol stack and onto the air interface.

In the push architecture, the LAT may coordinate with the LAS to determine the best bearer split option for each bearer/UE. In some instances, RRC policy may prohibit splitting of certain bearers. Various algorithms may be used for making traffic splitting decisions. The traffic splitting decision may account for link/channel conditions, QoS requirements, load balancing across multiple users, and/or the like. The LAS may adjust traffic split ratios based on coordination with, e.g., LTE and MAC schedulers. For example, the LAS may split traffic amongst the links in proportion to the average link throughput to equalize relative delays across the links In some embodiments, the LAS may use any of alternative scheduling/splitting policies, which may require simple analysis. For example, the LAS may use a WLAN link preferred policy for downlink (DL) transmissions and an LTE link preferred policy for uplink (UL) transmissions. Alternatively, or in addition, the LAS may jointly optimize bearer split decisions across multiple UEs based on different target metrics (e.g., a proportional fair throughput, packet delay, QoS, etc.). After the traffic split, the schedulers for each link may independently schedule data on each link and/or may coordinate scheduling decisions by periodically exchanging scheduling metrics (e.g., a per UE throughput metric, etc.). Lower layer metrics, such as average link throughput, average access delay, and/or the like, for each link may be made available to the LAS to enable such scheduling.

In the pull architecture, the splitting policy may be determined implicitly based on lower layers pulling data from link aggregation transmission buffers. The traffic may be routed to lower layers of each stack only when transmission opportunities become available on each link. The LAT may rely on lower layer signaling decisions to guide bearer split decisions. For example, the LAT may send a just sufficient amount of data to each radio access interface as dictated by lower layer scheduling decisions. In some embodiments, the schedulers in each radio interface may coordinate (e.g., via exchange of local scheduling metrics, resources available for allocation, etc.) when scheduling the transmission opportunities on their respective links.

The LAT may be responsible for segmenting PDUs according to the transmission opportunities available on each link. The lower layers may be responsible for indicating the available transmission opportunities to the LAT. In some embodiments, the lower layers may also make additional link quality statistics, such as packet error rate, congestion notification, etc., available to the LAT. The provision of such link quality statistics may be natively available at the RLC layer for an LTE link, but a WLAN link may need to be modified (e.g., through the addition of a WLAN control) to support the provision of similar information for the WLAN link.

In a hybrid architecture, essential aspects of the push and/or pull architectures may be combined. For example, in one embodiment, the lower layers of each stack may request traffic when transmission opportunities become available, but the LAT and/or LAS may make a final decision on how to respond to the data requests from the lower layers. Alternatively, or in addition, different mechanisms may be used for different links. For example, lower layers may request traffic for an LTE link, but the LAT may determine when to push traffic to a WLAN link or vice versa.

In some embodiments, a push architecture may be more general and more easily applicable across different protocol aggregation options and deployment scenarios than a pull architecture. A push architecture may be advantageous when sharing of a common buffer and/or tight integration between the stacks of each link is not feasible. A pull architecture may be more amenable to collocated deployments where a common buffer can be readily shared and where low-latency access to lower layer measurements may be available. In push and pull architectures, cross-RAT retransmissions and/or joint ARQ may be implemented, for example, at the link aggregation layer. In some embodiments, a hybrid architecture may be implemented. For example, an LAT/LAS in a push architecture may be cognizant of lower layer buffer requirements, or requests from lower layers in a pull architecture may require approval from the LAT/LAS operating at higher layers.

In some embodiments, the pull architecture may be more suited for below radio link control (RLC) layer aggregation options, because an RLC transmit function may support PDU segmentation and concatenation to align with medium access control (MAC) scheduler notification of available resource for transmission. The RLC layer may dynamically match the RLC PDU sizes according to transmission opportunities and allow for retransmission of unacknowledged data. On the receiver side, the RLC layer may natively support a reordering function but may tolerate relatively limited delay variations due to the short sequence number space (e.g., 10 bits). The pull architecture may also be used for higher layer aggregation options and/or non-collocated deployments.

In some embodiments, the push architecture may be more suited for above RLC layer but below PDCP layer aggregation options because the PDCP layer does not support segmentation of internet protocol (IP) packets received from upper layers. In addition, standardized mechanisms for lower layer interaction between the PDCP and scheduling layers may not be available. The push architecture may be more suited to non-collocated deployments where real-time interaction between functions of each radio interface may not be feasible. The push architecture may be augmented with elements of the pull architecture (even for non-collocated deployments) when the lower layer buffer status may be communicated to the LAT/LAS. The push architecture may also be used for lower layer aggregation options and/or collocated deployments.

The LAT may implement a joint ARQ protocol that allows for cross-RAT retransmissions of PDUs received in error on a primary link. In some embodiments, the LAT may default to ARQs for individual link and may not allow retransmissions at the link aggregation layer. To allow for cross-RAT retransmissions, the LAT may support a retransmit (Re-TX) buffer, which may be natively supported by an RLC layer architecture but may need to be added for PDCP layer architectures. The LAS/RRC may jointly design a cross-RAT retransmission policy with a mechanism to support ARQs for individual links. In an embodiment, WLAN ARQ mechanisms may be biased to send retransmissions on the LTE link when favorable conditions exist on the LTE link (e.g., the number of retries on the WLAN link may be lowered dynamically as a function of WLAN link quality). Once the packet fails on one link, the LAT may decide to retransmit on the LTE link based on a policy determined by the LAS jointly with the RRC.

Push, pull, hybrid, etc. architectures may be implemented for both collocated and non-collated WLAN/eNB deployments. Limitations on the quality of a backhaul link between the WLAN AP and the eNB may affect the performance of the pull architecture. In some embodiments, the push architecture may be more naturally suited for non-collocated deployments. The push architecture may include a flow control mechanism for transferring data between the eNB and the WLAN AP. Signaling between a non-collocated eNB and AP may proprietary, standardized as part of an X2 or X2-W interface, and/or the like.

In some push architecture embodiments, an X2-W interface may be used to send WLAN link quality metrics to an LAS at an eNB for used in determining a bearer split radio. The link quality metrics may include link throughput delay for individual UEs, delay, quality of experience (QoE), contention level (e.g., back-off status), buffer status, congestion indication or queue length, load level, average access delay, and/or the like. Additional signaling may also be used to communicate packet transmission confirmation status in embodiments with cross-RAT retransmission. The X2-W interface may be used to send an indication of bearer split activation, expected data transmission rate, and/or the like from the LAS at an eNB to a WLAN AP for each bearer. The LAS may transmit requests for the WLAN to report packet transmission confirmation, link quality reports, buffer status reports, and/or the like. The LAS may specify ARQ parameters for the WLAN link in order to increase the rate with which retransmissions are handled by the LTE link.

In some pull architecture embodiments, an X2-W interface may be used to send notifications of transmission opportunities on the WLAN link, packet/data requests for a number of packets and/or number of bytes, etc. from the WLAN AP to the LAT at the eNB. The X2-W interface may be used to send requested packet data, an indication of the proportion of requested data to be transferred, and/or the like from the LAT at the eNB to the WLAN AP. Signaling to enable cross-RAT retransmission may be similar to the previously discussed signaling for some push architecture embodiments.

Scheduler state information related to scheduling metrics (e.g., individual UE proportional fair throughput, etc.) may be exchanged between the WLAN AP and eNB in either push architectures or pull architectures. In some embodiments, new message may be defined for the X2-AP protocol to exchange measurements and control information over the X2 interface. Alternatively, or in addition, existing messages, such as messages used for resource status reporting, may be extended.

The previously discussed push architectures, pull architectures, and/or hybrid architectures may also be implemented for UEs to perform UL bearer splitting, joint ARQ, etc. In some embodiments, an enhanced and/or network-assisted architecture may be used for the UE to perform UL bearer splitting. In some embodiments, before sending any traffic over the LTE link, the UE may first send out a buffer status report (BSR) to the eNB. The BSR may indicate the uplink needs of the UE. For example, for a UE using only an LTE link, the BSR may be determined based on all packets waiting for transmission in the PDCP and RLC buffers. For a UE performing UL bearer splitting, some of the packets may be sent over another link, so it may be difficult for the UE to determine in advance the number of bytes that will be sent over the LTE link. Accordingly, the UE may receive eNB assistance to a UE-controlled bearer splitting algorithm. For example, the UE may transmit a BSR for the link aggregation function, and the BSR may indicate overall buffers status and request separate allocations for each link (e.g., a WLAN link and an LTE link).

The UE LAS may coordinate with an eNB LAS to submit the BSR and receive appropriate resource grants, which may be jointly across multiple radio links. The eNB may determine the UL split based on various link quality, loading, and/or congestion parameters observed across all users associated with the eNB. The eNB may also determine a joint allocation across resources of multiple radio links. The format of resource allocation notifications may vary for different radio links. In an embodiment, the eNB may assign a probability of transmission for a WLAN link, which may be used by the UE to back-off from contending on the WLAN link. For example, the eNB may schedule the UE for transmission on the WLAN link by assigning a transmission probability of 1 to the UE, which may indicate that if only commonly controlled UEs are using the WLAN access, the UE will effectively be able to schedule its transmission without contention. Alternatively, or in addition, the UE may be assigned a time slot for transmission, which may be loosely synchronized with LTE transmissions. Alternate methods for assigning transmission opportunities will be apparent to those of skill in the art.

Various methods may be used by the eNB to notify the UE of a joint allocation to the UE. In an embodiment, the eNB may only notify the UE of an UL grant on the LTE link. The UE may utilize the allocated bandwidth on the LTE link and transmit the remainder of the requested allocation over an alternate link. Alternatively, or in addition, the eNB may explicitly notify the UE of its UL LTE allocation as well as, for example, a WLAN probability of transmission.

FIG. 1 is a schematic diagram of a system 100 for communicating with a UE 110 over multiple radio links An EPC may include a packet gateway (P-GW) 140 and a serving gateway (S-GW) 130 (e.g., shown as configured to communicate packets through an S5/S8 bearer) that may route bearer traffic to an integrated AP, which may include an eNB 120 and a WLAN AP 125. The eNB 120 and the WLAN AP 125 may be communicatively coupled with one another and may communicate lower layer metrics, scheduling metrics, bearer splitting configuration, data traffic, requests for data, and/or the like. The system 100 may be anchored by the eNB 120, which may receive data traffic (e.g., via an S1 bearer) and may split the data traffic for transmission to the UE 110 over multiple radio links (e.g., LTE and WLAN). The eNB 120 and the WLAN AP 125 may be collocated or may be non-collocated. The WLAN AP 125 may be communicatively coupled to the Internet 150 though a non-seamless WLAN offload (NSWO) instead of or in addition to the EPC. The eNB 120 may be communicatively coupled to the UE 110 via an LTE link, and the WLAN AP 125 may be communicatively coupled to the UE 110 by a WLAN link. The LTE and WLAN links may be distinct and may allow for independent and substantially simultaneous transmission of data traffic to the UE 110. The WLAN link may tunnel data received by the eNB 120 to the UE 110.

Figure 2:
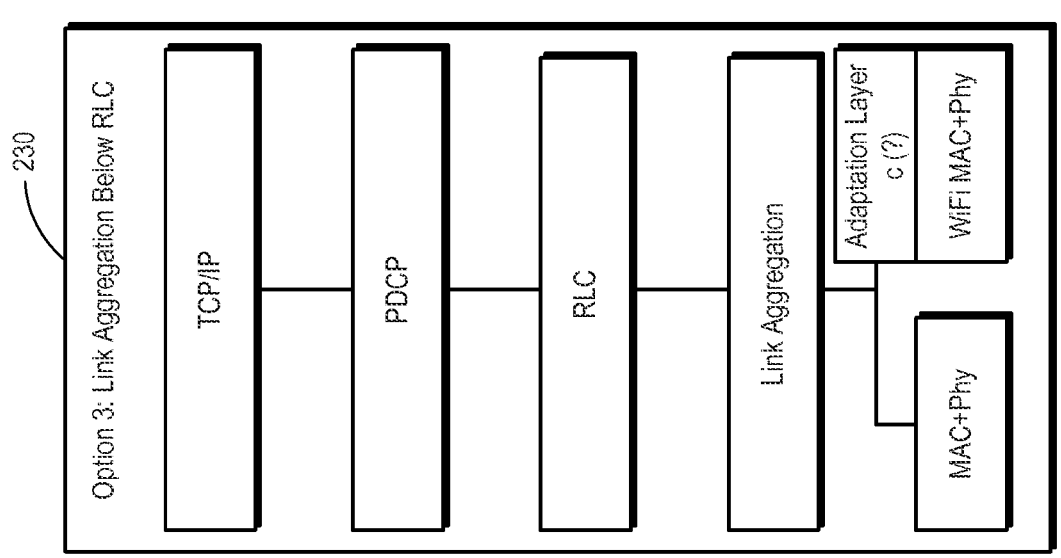
FIG. 2 is a schematic diagram of a plurality of options for different layers at which a bearer may be split.
Figure 2:
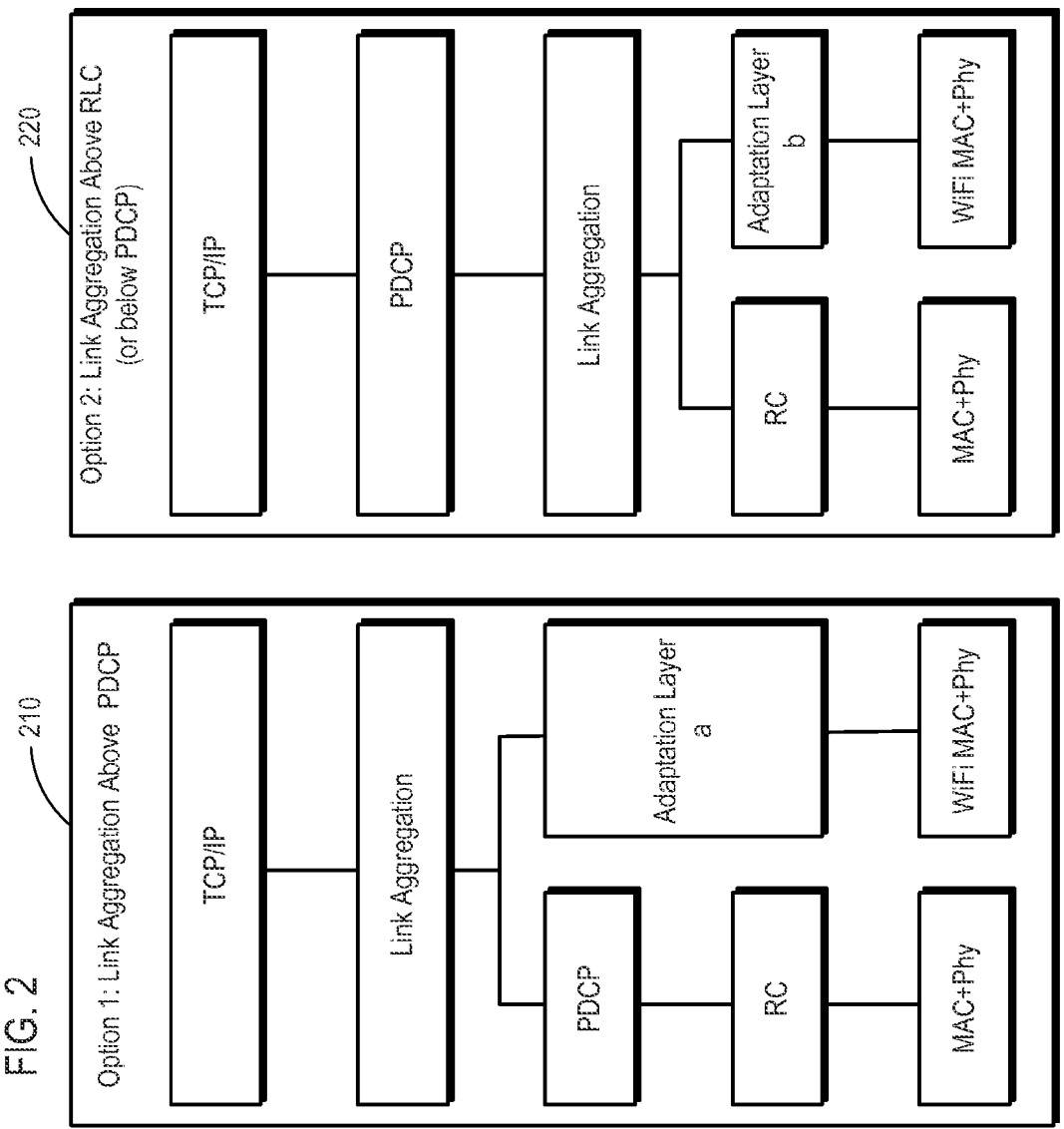

FIG. 2 is a schematic diagram of a plurality of options 210, 220, 230 for different layers at which a bearer may be split. For example, a first option 210 may split bearer traffic above a PDCP layer. A first portion of the bearer traffic may be sent via an LTE stack, which may include a PDCP layer, an RLC layer, a MAC layer, and a physical layer. A second portion of the bearer traffic may be sent via a WLAN stack, which may include an adaptation layer (e.g., for performing some or all of the functions of the PDCP and/or RLC layers), a MAC layer, and a physical layer.

A second option 220 may split bearer traffic below the PDCP layer but above an RLC layer. A first portion of the bearer traffic may be sent via the LTE stack, which, in this option, may include an RLC layer, a MAC layer, and a physical layer. A second portion of the bearer traffic may be sent via the WLAN stack, which may include an adaptation layer (e.g., for performing some or all of the functions of the RLC layer), a MAC layer, and a physical layer. The adaptation layer in the second option 220 may not need to perform functions of the PDCP layer.

A third option 230 may split bearer traffic below the RLC layer as well as the PDCP layer. A first portion of the bearer traffic may be sent directly to the MAC and physical layers of the LTE stack. A second portion of the bearer traffic may be sent to the MAC and physical layers of the WLAN stack. In some embodiments, the WLAN stack may still include an adaptation layer to adapt the second portion of the bearer traffic transmission over the WLAN stack.

Figure 3A:
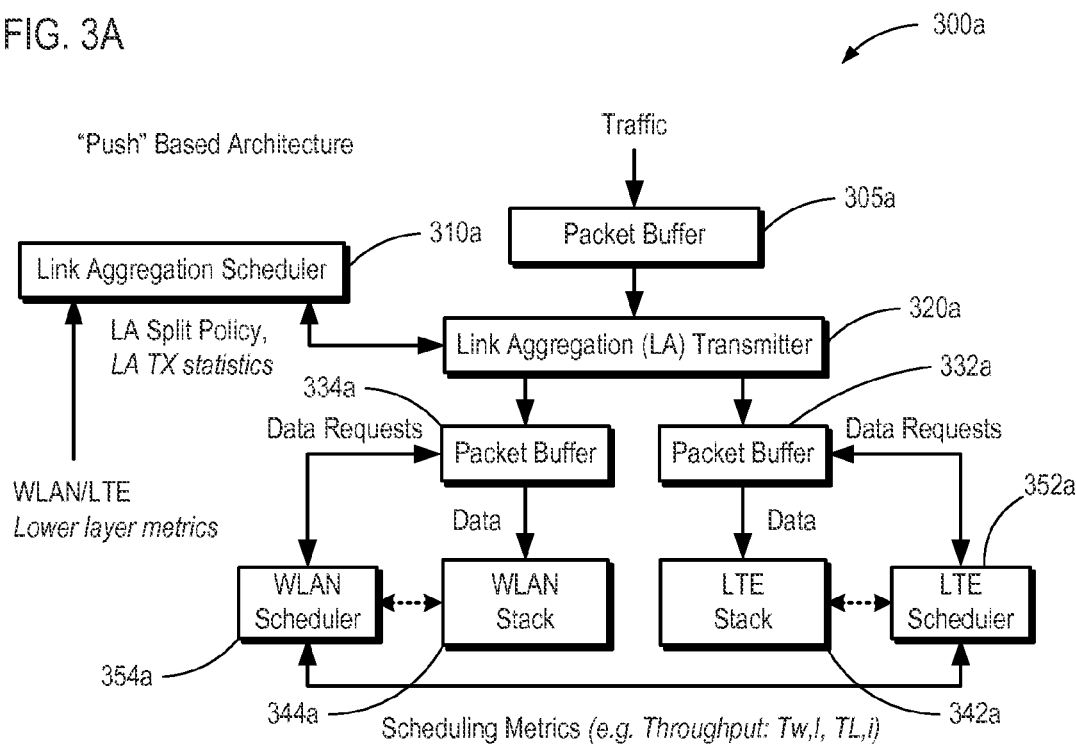
FIG. 3A is a schematic diagram of a push architecture for splitting bearer traffic between an LTE stack and a WLAN stack.

FIG. 3A is a schematic diagram of a push architecture 300a for splitting bearer traffic between an LTE stack 342a and a WLAN stack 344a. Data traffic may be received in a packet buffer 305a. An LAS 310a may receive lower layer metrics from the LTE and WLAN stacks 342a, 344a, and the LAS 310a may explicitly determine a bearer split policy, which may specify the proportion of data traffic to be transmitted over each stack. The LAS 310a may provide the bearer split policy to an LAT 320a, which may split the data traffic according to the bearer split policy received from the LAS 310a. The LAT 320a may push the split data to packet buffers 332a, 334a for each stack 342a, 344a. The LTE and WLAN stacks 342a, 344a may process and transmit the data from the packet buffers 332a, 334a. LTE and WLAN schedulers 352a, 354a may schedule transmission of the data and may request data from the packet buffers 332a, 334a for the LTE and WLAN stacks 342a, 344a. In some embodiments, the schedulers 352a, 354a may exchange scheduling metrics and may loosely synchronize transmissions by the LTE and WLAN stacks 342a, 344a.

Figure 3B:
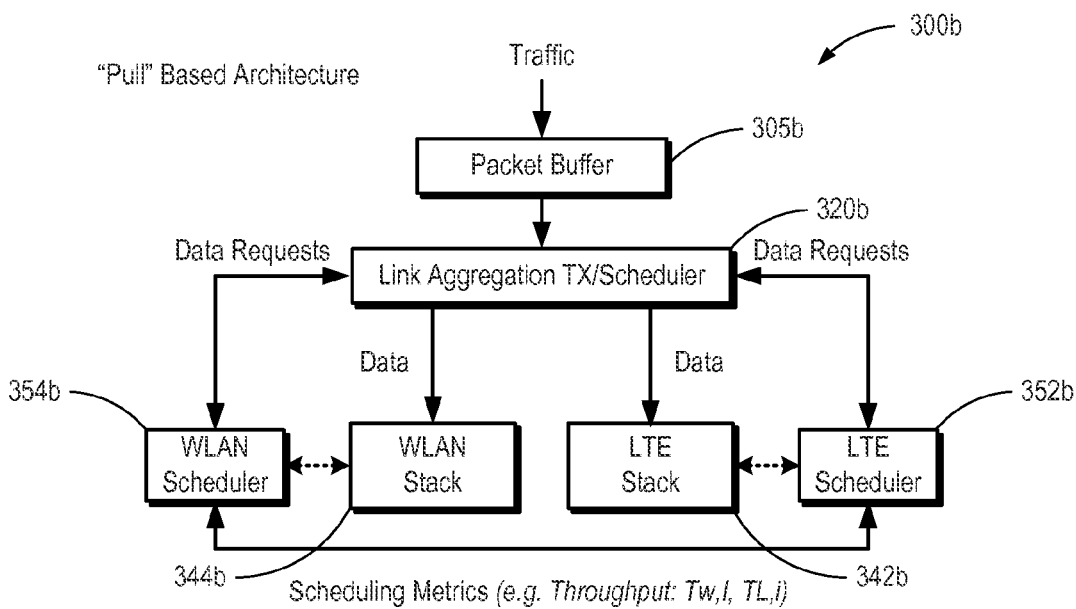
FIG. 3B is a schematic diagram of a pull architecture for splitting bearer traffic between an LTE stack and a WLAN stack.

FIG. 3B is a schematic diagram of a pull architecture 300b for splitting bearer traffic between an LTE stack 342b and a WLAN stack 344b. Data traffic may be received in a packet buffer 305b. An LAT/LAS 320b may determine how to split the data traffic between the LTE stack 342b and the WLAN stack 344b. The LAT/LAS 320b may implicitly determine a bearer split policy based on data requests received from the LTE and WLAN stacks 342b, 344b when transmission opportunities become available. For example, LTE and WLAN schedulers 352b, 354b may determine when a transmission opportunity is available and may request data from the LAT/LAS 320b in response to detecting the transmission opportunity. Because data traffic is only provided when a transmission opportunity is available, the packet buffers 332a, 334a of the push architecture 300a may not be needed. Similarly, the separate LAS 310a of the push architecture 300a may not be needed since the bearer split policy is determined implicitly. As before, the schedulers 352b, 354b may exchange scheduling metrics and may loosely synchronize transmissions by the LTE and WLAN stacks 342b, 344b.

Figure 4A:
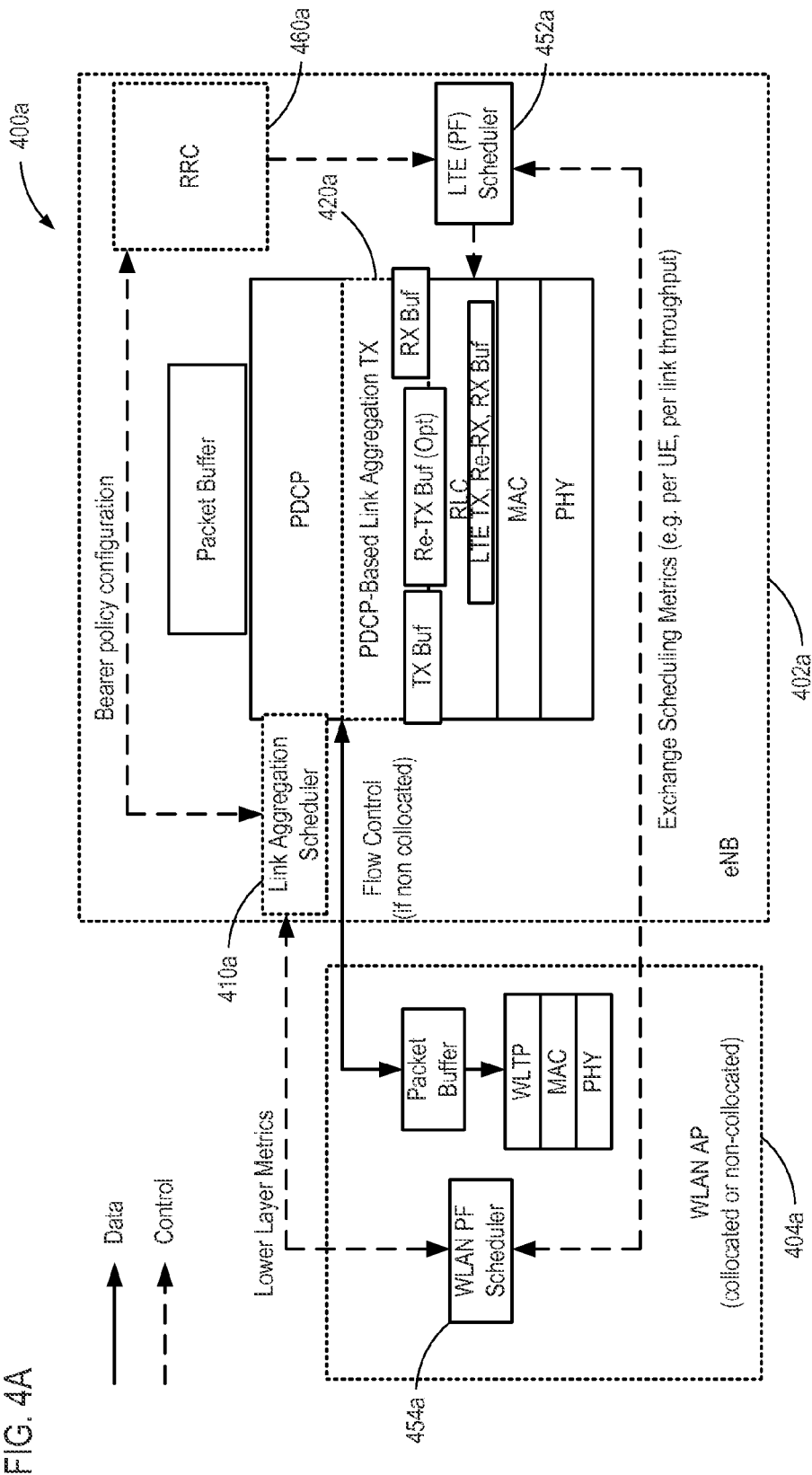
FIG. 4A is a schematic diagram of a PDCP based push architecture for splitting bearer traffic between an eNB and a WLAN AP.

FIG. 4A is a schematic diagram of a PDCP based push architecture 400a for splitting bearer traffic between an eNB 402a and a WLAN AP 404a. The eNB 402a and the WLAN AP 404a may be collocated or non-collocated. The eNB 402a may include an LAS 410a. The LAS 410a may receive lower layer metrics from a WLAN scheduler 454a and an LTE scheduler 452a. The LAS 410a may also receive a bearer policy configuration from an RRC 460a. For example, the bearer policy configuration may specify that certain bearers cannot be split. The eNB 402a may include a PDCP-based LAT 420a, which may be responsible for determining which data traffic to send to the WLAN AP 404a and which data traffic should remain in the LTE stack. The LAT 420a may also determine flow control for the WLAN AP 404a in non-collocated embodiments.

Figure 4B:
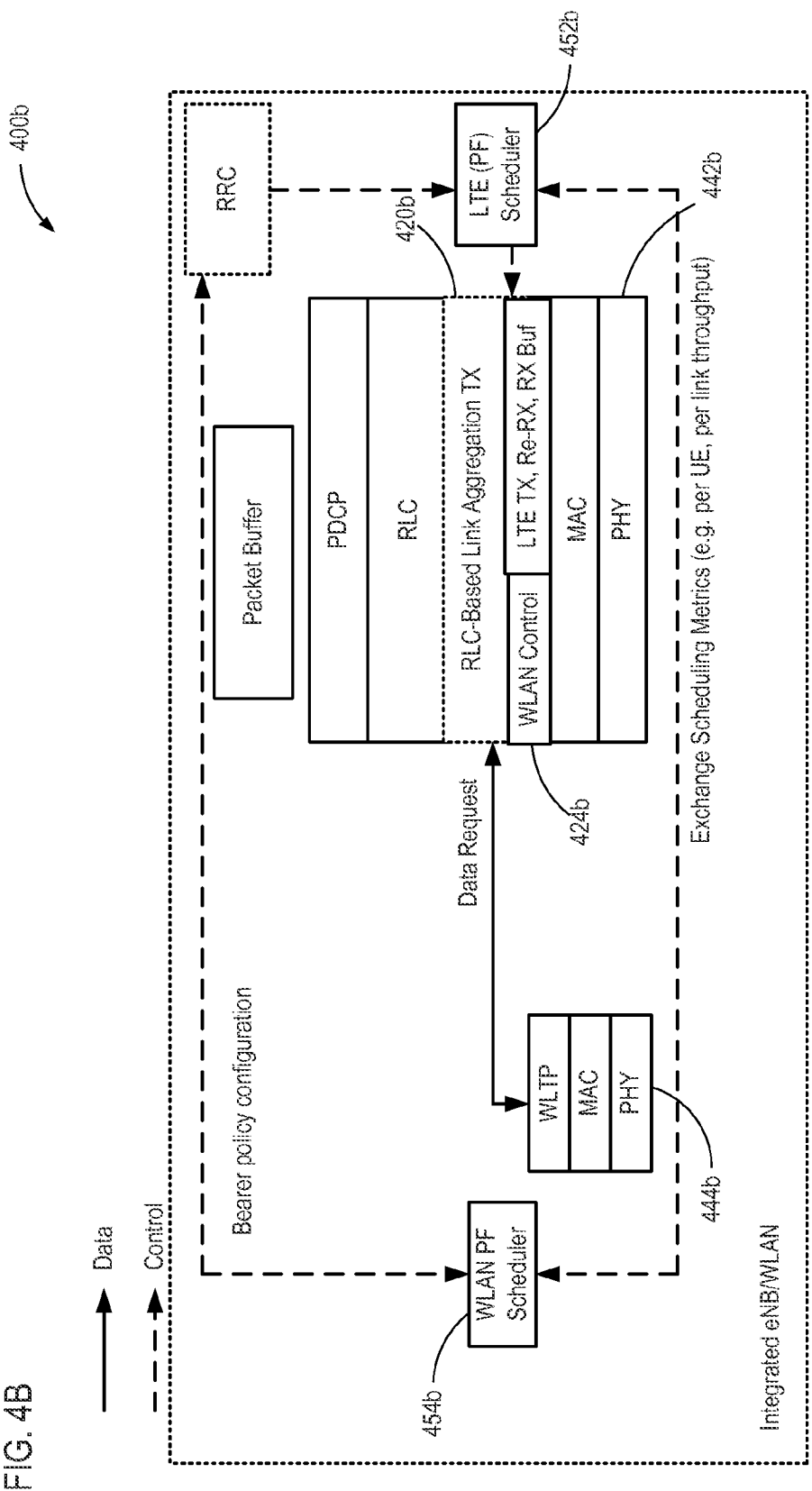
FIG. 4B is a schematic diagram of an RLC based pull architecture for splitting bearer traffic between an LTE radio access interface and a WLAN radio access interface of an integrated eNB/LAN.

FIG. 4B is a schematic diagram of an RLC based pull architecture 400b for splitting bearer traffic between an LTE radio access interface 442b and a WLAN radio access interface 444b of an integrated eNB/LAN. In the illustrated embodiment, the LTE radio access interface 442b and the WLAN radio access interface 444b are collocated, but the LTE and WLAN radio access interfaces 442b, 444b may be non-collocated in other embodiments. An LAT 420b may be responsible for segmenting data traffic among the LTE radio access interface 442b and the WLAN radio access interface 444b when transmission opportunities become available. For example, radio access interface 442b, 444b may request and/or pull data when transmission opportunities become available. Coordination amongst the lower layer scheduling functions may be performed by exchanging scheduling metrics, resources available for allocation, etc. using the LTE and WLAN schedulers 452b, 454b. In some embodiments, link quality statistics, such as packet error rate, congestion notification, etc. may be made available to the LAT 420b. For example, the RLC layer of the LTE radio access interface 442b may make the information available for the LTE radio access interface, and a WLAN control 424*b* may make the information available for the WLAN radio access interface 444*b*.

Figure 5:
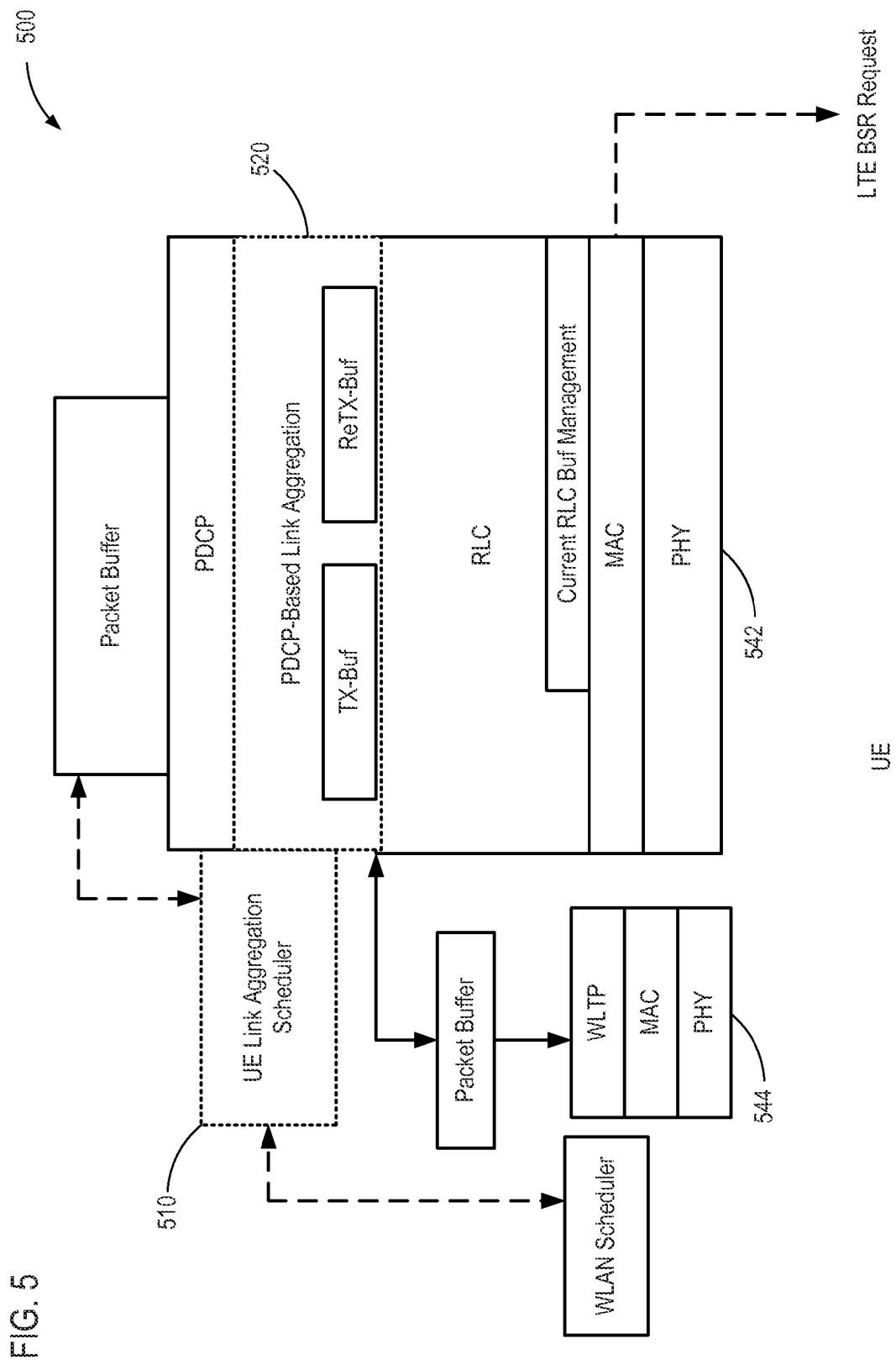
FIG. 5 is a schematic diagram of a UE configured to split bearer traffic using a PDCP based push architecture.

FIG. 5 is a schematic diagram of a UE 500 configured to split bearer traffic using a PDCP based push architecture. The UE 500 may control splitting of the bearer traffic. The UE 500 may transmit an LTE BSR request to receive a resource allocation for an LTE radio access interface 542. In some embodiments, the UE 500 may receive a maximum probability of UL transmission from the eNB and adjust a WLAN UL transmission probability for the WLAN radio access interface 544 accordingly. An LAS 510 may use local link information, the received resource allocation, and/or the WLAN UL transmission probability to adjust a split ratio. The LAT 520 may segment traffic between the LTE and WLAN radio access interfaces 542, 544 based on the determined split ratio.

Figure 6:
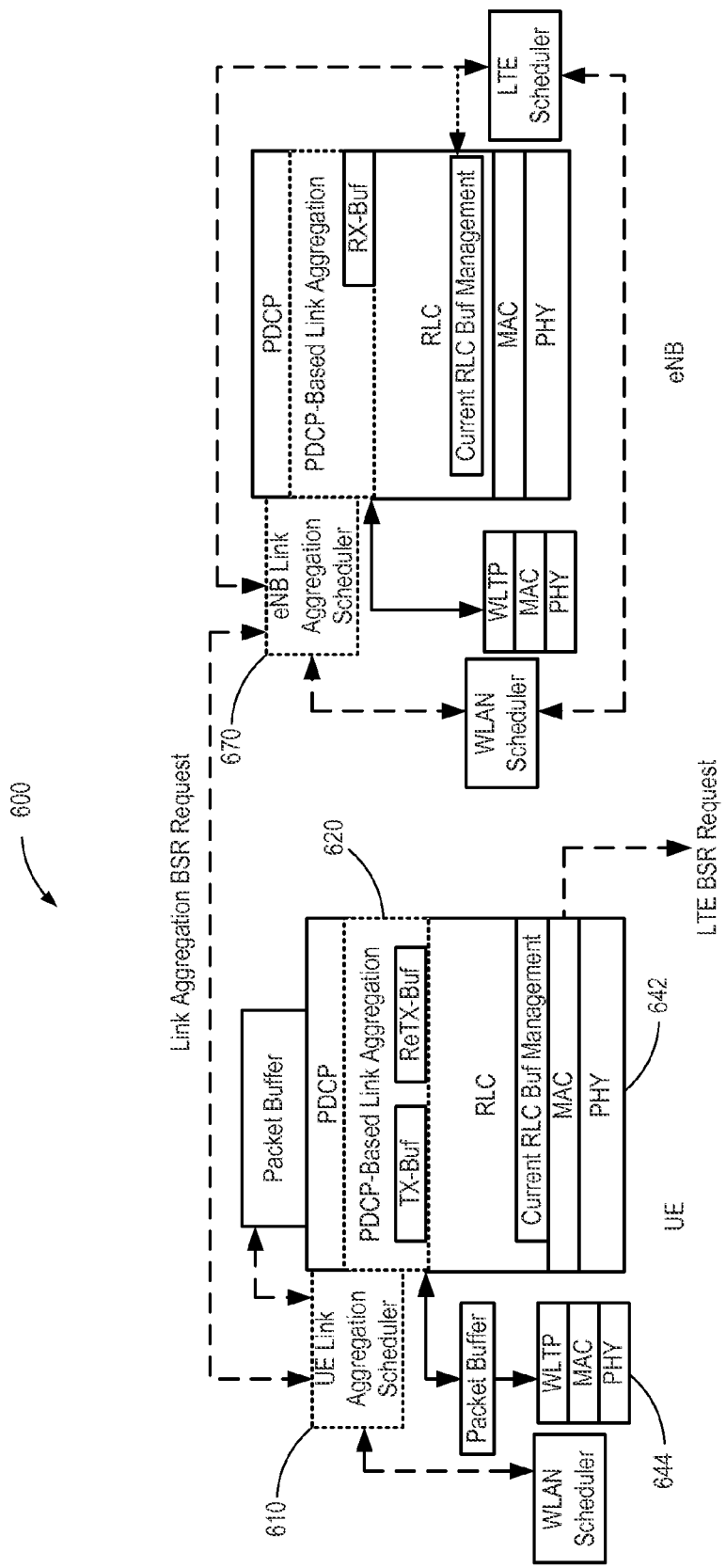
FIG. 6 is a schematic diagram of a UE configured to split bearer traffic using a PDCP based push architecture with network assistance.

FIG. 6 is a schematic diagram of a UE 600 configured to split bearer traffic using a PDCP based push architecture with network assistance. A UE LAS 610 may transmit total BSR requests to an eNB LAS 670. The eNB LAS 670 may determine a split ratio based on link conditions on WLAN and LTE links across all users. In some embodiments, the eNB LAS 670 may independently determine a WLAN UL transmission probability and an LTE allocation. Alternatively, or in addition, the UE LAS 610 may control the WLAN transmission probability. The UE LAS 610 may implement traffic splitting based on the split ratio received from the eNB LAS 670. For example, the UE LAS 610 may instruct a UE LAT 620 to push packets to each radio access interface 642, 644 based on the split ratio.

Figure 7:
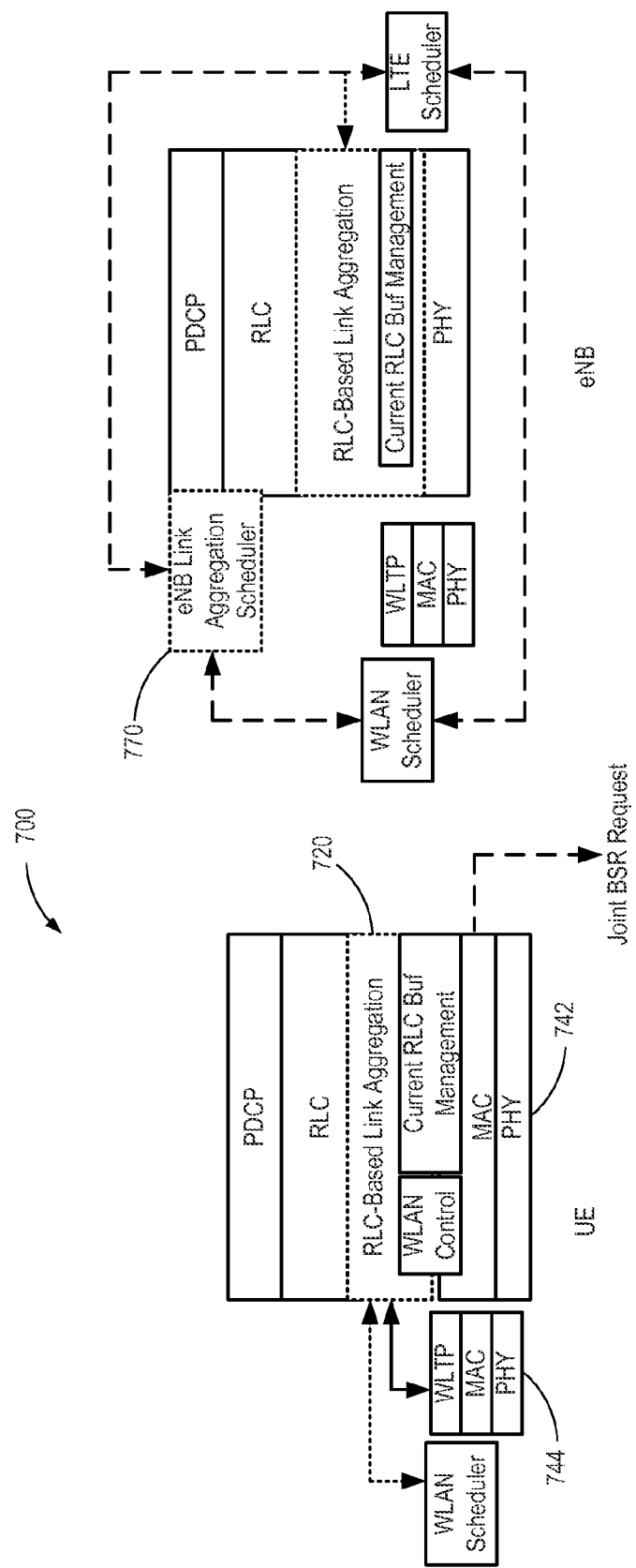
FIG. 7 is a schematic diagram of a UE configured to split bearer traffic using an RLC based pull architecture with network assistance.

FIG. 7 is a schematic diagram of a UE 700 configured to split bearer traffic using an RLC based pull architecture with network assistance. A UE LAT 720 may transmit joint BSR requests to an eNB LAS 770. The eNB LAS 770 may determine an allocation policy on the LTE and/or WLAN links. The UE LTE radio access interface 742 may pull data traffic and send it over the LTE link based on the LTE allocation from the eNB LAS 770. The WLAN radio access interface 744 may pull data and send it over the WLAN link based on transmission probabilities from the eNB LAS 770. Alternatively, or in addition, the UL transmission probabilities may be predefined according to rules rather than being provided by the eNB LAS 770.

Figure 8A:
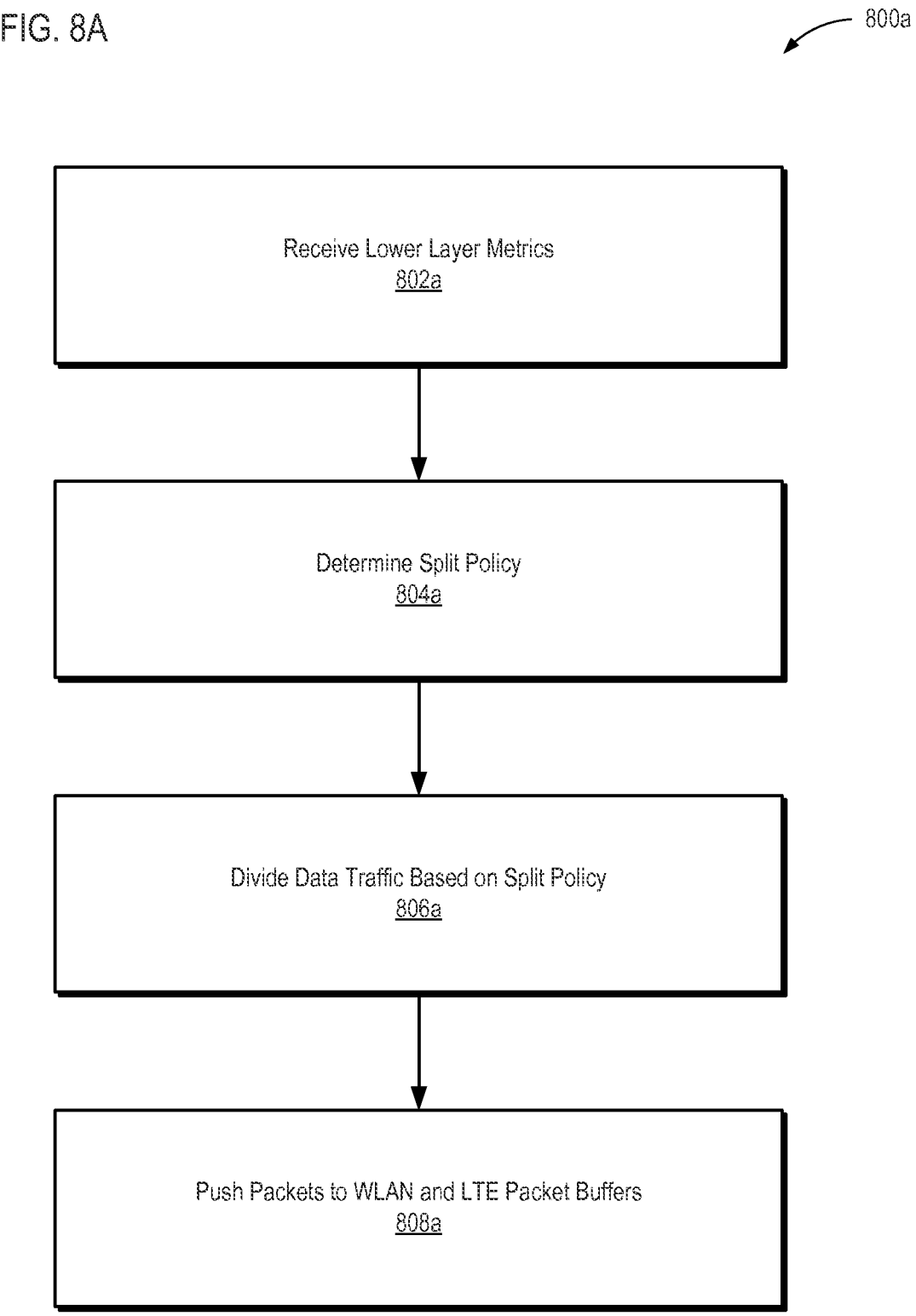
FIG. 8A is a flow diagram of a method for transmitting data over multiple radio links using a push or hybrid architecture.

FIG. 8A is a flow diagram of a method 800*a* for transmitting data over multiple radio links using a push or hybrid architecture. Lower layer metrics may be received 802*a* and may indicate link/channel conditions of each radio link. The metrics may also, or instead, include user QoS requirements, load balancing across multiple users, and/or the like. Based on the lower layer metrics, a split policy may be determined 804*a*. The split policy may include a proportion of data traffic to be sent over each radio link. The split policy may be determined for an individual bearer, for multiple bearers, for an individual user, and/or the like. Various algorithms may be used to determine the split policy based on the lower layer metrics.

The data traffic may be divided 806*a* based on the split policy. In some embodiments, the data traffic may be segmented and/or concatenated to align with lower layer transmission opportunities. Alternatively, it may not be possible to segment and/or concatenate the received data, so the radio link used to transmit each received PDU may be determined so as to approximately match the split policy. The data traffic may be pushed 808*a* to packet buffers of each radio access interface based on decisions on dividing the data traffic. The radio access interfaces may then transmit the buffered data according to their own scheduling rules.

Figure 8B:
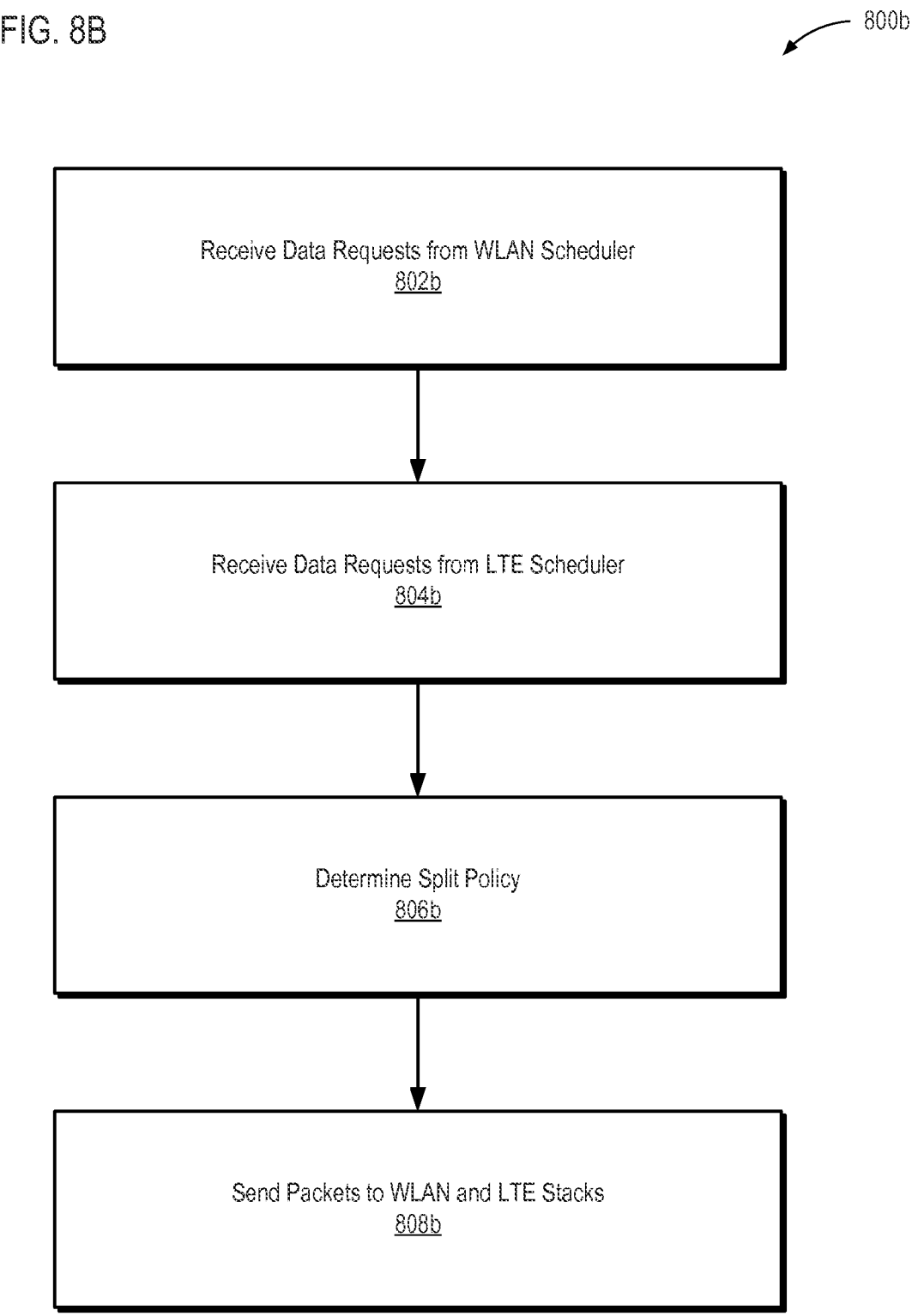
FIG. 8B is a flow diagram of a method for transmitting data over multiple radio links using a pull or hybrid architecture.

FIG. 8B is a flow diagram of a method 800*b* for transmitting data over multiple radio links using a pull or hybrid architecture. Data requests may be received 802*b* from a WLAN scheduler. Data requests may also be received 804*b* from an LTE scheduler. The WLAN and LTE schedulers may make the data requests only when a transmission opportunity becomes available. In some embodiments, the transmission opportunities may be determined based on a resource allocation determined by an LAS and/or LAT. The link/channel conditions may determine how many data requests are made by each scheduler, so the number of data requests may be indicative of the underlying link/channel conditions.

A split policy may be determined 806*b* based on the data requests. For example, determining 806*b* the split policy may include deciding whether to overrule the received data requests. The split policy and decisions of whether to overrule the received data requests may be based on lower layer metrics. In some embodiments, the element of determining 806*b* the split policy may be omitted and all data requests may be fulfilled without an explicit split policy. Data traffic may be sent 808*b* to the WLAN and LTE stacks according to the split policy and/or data requests. In some embodiments, the data may be segmented and/or concatenated before being sent to the WLAN and/or LTE stacks to fit the available transmission opportunities. Once the WLAN and LTE stacks receive the data traffic, the radio access interfaces may use the available transmission opportunities to transmit the data traffic.

Figure 9:
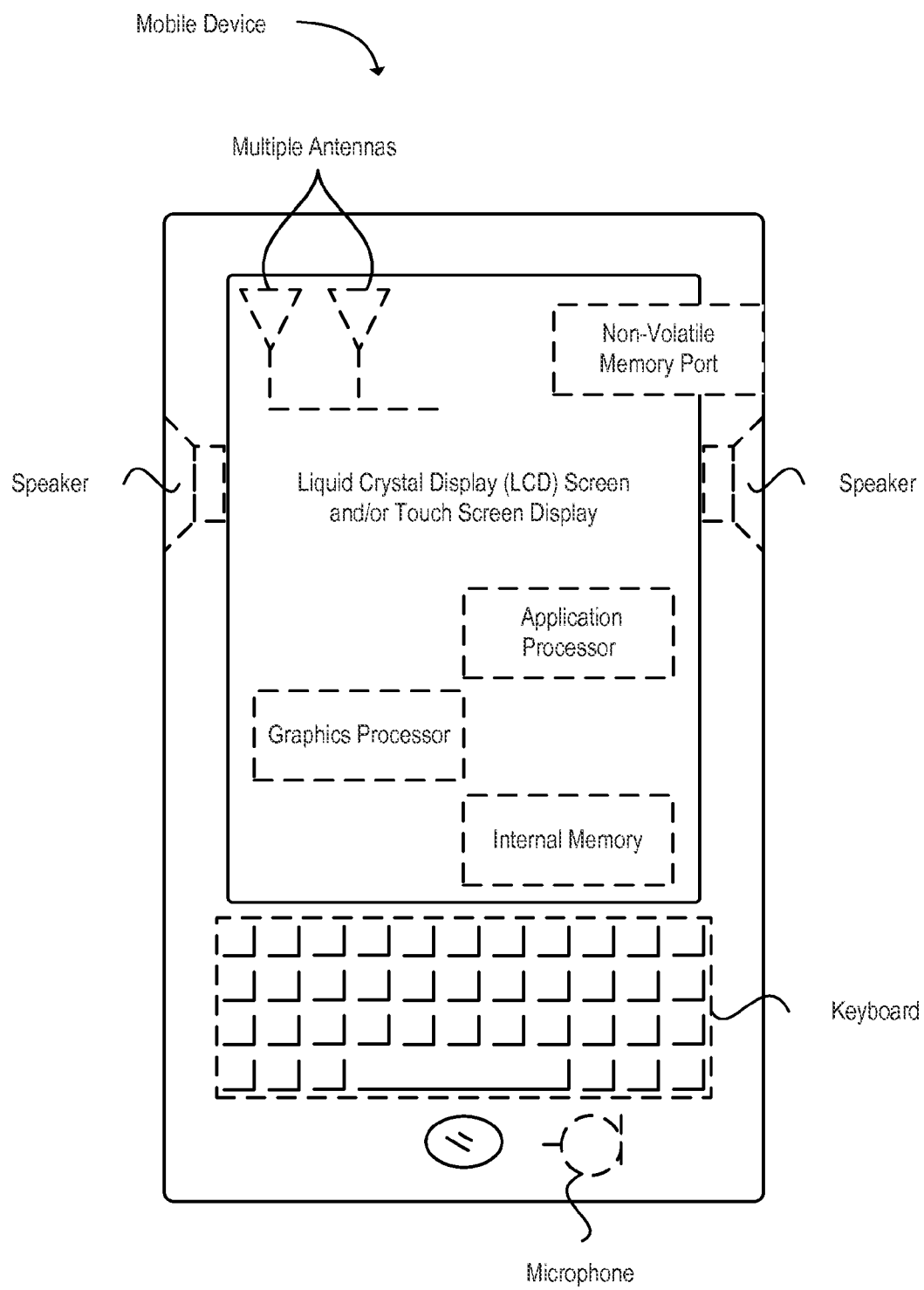
FIG. 9 is a schematic diagram of a UE able to send and/or receive data traffic over multiple radio links according to a push and/or pull architecture.

FIG. 9 is an example illustration of a mobile device, such as a UE, a mobile station (MS), a mobile wireless device, a mobile communication device, a tablet, a handset, or another type of wireless communication device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, high speed packet access (HSPA), Bluetooth, and Wi-Fi. The mobile device can communicate using separate antennas for each wireless communication standard or shared antennas for multiple wireless communication standards. The mobile device can communicate in a WLAN, a wireless personal area network (WPAN), and/or a WWAN.

FIG. 9 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

EXAMPLES

The following examples pertain to further embodiments:

Example 1 is an eNB operating in a RAN anchored multi-radio heterogeneous network. The eNB includes a link aggregation transmitter configured to receive data traffic transmitted over a Long-Term Evolution (LTE) bearer. The link aggregation transmitter is also configured to determine a proportion of the data traffic to be transmitted over an LTE link and a proportion of the data traffic to be transmitted over a wireless local area network (WLAN) link. The link aggregation transmitted is also configured to split the data traffic among between the LTE link and the WLAN link based on the determined proportions.

In Example 2, the link aggregation transmitter of Example 1 splits the data traffic at a layer selected from the group consisting of above a PDCP layer, at the PDCP layer, below the PDCP layer, and below an RLC layer.

In Example 3, the eNB of any of Examples 1-2 also includes a link aggregation scheduler configured to calculate the proportions of the data traffic to be transmitted over the LTE and WLAN links based on lower layer metrics. The link aggregation transmitter determines the proportions by receiving an indication of the proportions from the link aggregation scheduler.

In Example 4, the lower layer metrics of Example 3 include a metric selected from the group consisting of link quality, link congestion, and buffer status.

In Example 5, the link aggregation transmitter of any of Examples 1-4 determines the proportions by receiving requests for data from each of a WLAN radio access interface and an LTE radio access interface when transmission opportunities become available.

In Example 6, the link aggregation transmitter of Example 5 determines how to respond to the requests for data based on lower layer metrics.

In Example 7, the link aggregation transmitter of any of Examples 1-4 determines the proportion to be transmitted over the LTE link by receiving requests for data from an LTE radio access interface and determines the proportion to be transmitted over the WLAN link based on lower layer metrics.

In Example 8, a WLAN radio access interface is non-collocated with the eNB of any of Examples 1-7.

Example 9 is a method for communicating using multiple radios. The method includes calculating, at a base station, a data split between a first radio interface and a second radio interface for downlink traffic. The method also includes providing data to the first and second radio interfaces according to the calculated data split for transmission to a wireless communication device.

In Example 10, calculating the data split of Example 9 includes calculating the data split based on lower layer measurements for each radio interface.

In Example 11, calculating the data split of any of Examples 9-10 includes implicitly determining the data split based on requests for data from each radio interface.

In Example 12, the method of any of Examples 9-11 includes calculating a data split for uplink traffic received from the wireless communication device.

In Example 13, calculating the data split for uplink traffic of Example 12 includes calculating the data split based on buffer status reports received from the wireless communication device and lower layer metrics.

In Example 14, the method of any of Examples 9-13 includes informing the wireless communication device of a resource allocation for each radio.

In Example 15, informing the wireless communication device of the resource allocation of Example 14 includes providing a probability of transmission over the second radio interface.

In Example 16, informing the wireless communication device of the resource allocation of any of Examples 14-15 includes assigning time slots for the first radio interface and the second radio interface. The assigned time slots for each radio interface are loosely synchronized.

Example 17 is an apparatus including means to perform a method as described in any of Examples 9-16.

Example 18 is at least one computer-readable storage medium having stored thereon computer-readable instructions, which when executed, implement a method or realize an apparatus as described in any preceding example.

Example 19 is an apparatus (e.g., a UE) for communicating with a base station over multiple radio links. The apparatus includes a scheduler configured to determine a division of data between a first radio link and a second radio link. The scheduler is also configured to divide the data into a first portion for the first radio link and a second portion for the second radio link according to the determined division. The apparatus includes a first transceiver configured to transmit the first portion of data over the first radio link. The apparatus includes a second transceiver configured to transmit the second portion of data over the second radio link.

In Example 20, the scheduler of Example 19 is configured to determine the division locally based on lower layer measurements.

In Example 21, the scheduler of Example 20 assigns the first portion of data to the first transceiver and the second portion of data to the second transceiver according to the determined division.

In Example 22, the scheduler of Example 19 is configured determine the division based on transmission opportunities available for each of the first transceiver and the second transceiver.

In Example 23, the scheduler of Example 19 is configured to determine the division based on a base station indication of the division.

In Example 24, the scheduler of Example 23 is configured to receive an indication of an allocation of resources from the base station.

In Example 25, the scheduler of Example 24 is configured to push data to the first and second transceivers based on the allocation of resources.

In Example 26, the scheduler of Example 24 is configured to receive requests for data from the first and second transceiver when transmission opportunities are available. The scheduler is configured to fulfill the requests based on the allocation of resources.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium, wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

Those having skill in the art will appreciate that many changes may be made to the details of the above-described embodiments without departing from the underlying principles of the disclosure. The scope of the present application should, therefore, be determined only by the following claims.

The invention claimed is:

1. An evolved universal terrestrial radio access network (E-UTRAN) Node B (eNB) operating in a radio access network (RAN) anchored multi-radio heterogeneous network, the eNB comprising:
   a link aggregation scheduler configured to:
      determine a Long-Term Evolution (LTE) proportion of the data traffic to be transmitted over an LTE link and a WLAN proportion of the data traffic to be transmitted over a wireless local area network (WLAN) link;
      provide instructions, to a push-based link aggregation transmitter, that includes a proportion comprising the LTE proportion or the WLAN proportion;
   a push-based link aggregation transmitter forming a protocol layer within an enhanced LTE protocol stack, the push-based link aggregation transmitter configured to:
      receive data traffic transmitted over a LTE bearer into a traffic packet buffer;
      receive the instructions, from the link aggregation scheduler, that includes the proportion;
      retrieve data from the traffic packet buffer;
      provide a portion of the data to a WLAN packet buffer for transmission using a WLAN protocol stack based at least in part on the proportion; and
      provide a portion of the data to a LTE packet buffer for transmission using a LTE protocol stack based at least in part on the proportion.

2. The eNB of claim 1, wherein the link aggregation transmitter splits the data traffic at a layer selected from the group consisting of above a packet data convergence protocol (PDCP) layer, at the PDCP layer, below the PDCP layer, and below a radio link control (RLC) layer.

3. The eNB of claim 1, further comprising a link aggregation scheduler configured to calculate the proportions of the data traffic to be transmitted over the LTE and WLAN links based on lower layer metrics, wherein the link aggregation transmitter determines the proportions by receiving an indication of the proportions from the link aggregation scheduler.

4. The eNB of claim 3, wherein the lower layer metrics include a metric selected from the group consisting of link quality, link congestion, and buffer status.

5. The eNB of claim 1, wherein the link aggregation transmitter determines the proportions by receiving requests for data from each of a WLAN radio access interface and an LTE radio access interface when transmission opportunities become available.

6. The eNB of claim 5, wherein the link aggregation transmitter determines how to respond to the requests for data based on lower layer metrics.

7. The eNB of claim 1, wherein the link aggregation transmitter determines the proportion to be transmitted over the LTE link by receiving requests for data from an LTE radio access interface and determines the proportion to be transmitted over the WLAN link based on lower layer metrics.

8. The eNB of claim 1, wherein a WLAN radio access interface is non-collocated with the eNB.

9. A method for communicating using multiple radios, the method comprising:
    calculating, at a base station, a data split between a cellular proportion of the data traffic to be transmitted over a cellular link and a WLAN proportion of the data traffic to be transmitted over a wireless local area network (WLAN) link; and
    receiving data traffic transmitted over a cellular bearer into a traffic packet buffer;
    retrieving data from the traffic packet buffer;
    providing a portion of the data to the WLAN packet buffer for transmission using a WLAN protocol stack according to the calculated data split for transmission to a wireless communication device
    providing a portion of the data to the cellular packet buffer for transmission using a cellular protocol stack according to the calculated data split for transmission to a wireless communication device.

10. The method of claim 9, wherein calculating the data split comprises calculating the data split based on lower layer measurements for each radio interface.

11. The method of claim 9, wherein calculating the data split comprises implicitly determining the data split based on requests for data from each radio interface.

12. The method of claim 9, further comprising calculating a data split for uplink traffic received from the wireless communication device.

13. The method of claim 12, wherein calculating the data split for uplink traffic comprises calculating the data split based on buffer status reports received from the wireless communication device and lower layer metrics.

14. The method of claim 12, further comprising informing the wireless communication device of a resource allocation for each radio.

15. The method of claim 14, wherein informing the wireless communication device of the resource allocation comprises providing a probability of transmission over the second radio interface.

16. The method of claim 14, wherein informing the wireless communication device of the resource allocation comprises assigning time slots for the first radio interface and the second radio interface, and wherein the assigned time slots for each radio interface are loosely synchronized.

17. A user equipment (UE) for communicating with a base station over multiple radio links, the UE comprising:
    a scheduler configured to:
        determine a division of data between a Long-Term Evolution (LTE) radio link and a wireless local area network (WLAN) radio link, and
        divide data from a traffic packet buffer into a first portion in a LTE traffic buffer for the LTE radio link and a second portion in a WLAN traffic buffer for the WLAN radio link according to the determined division;
    a first transceiver configured to retrieve data from the LTE traffic buffer and transmit the first portion of data over the first radio link; and
    a second transceiver configured to retrieve data from the WLAN traffic buffer and transmit the second portion of data over the second radio link.

18. The UE of claim 17, wherein the scheduler is configured to determine the division locally based on lower layer measurements.

19. The UE of claim 18, wherein the lower layer metrics include a metric selected from the group consisting of link quality, link congestion, and buffer status.

20. The UE of claim 18, wherein the scheduler assigns the first portion of data to the first transceiver and the second portion of data to the second transceiver according to the determined division.

21. The UE of claim 17, wherein the scheduler is configured determine the division based on transmission opportunities available for each of the first transceiver and the second transceiver.

22. The UE of claim 17, wherein the scheduler is configured to determine the division based on a base station indication of the division.

23. The UE of claim 22, wherein the scheduler is configured to receive an indication of an allocation of resources from the base station.

24. The UE of claim 23, wherein the scheduler is configured to push data to the first and second transceivers based on the allocation of resources.

25. The UE of claim 23, wherein the scheduler is configured to receive requests for data from the first and second transceiver when transmission opportunities are available, and wherein the scheduler is configured to fulfill the requests based on the allocation of resources.

* * * * *